United States Patent
Abd Elhamid et al.

(10) Patent No.: US 11,125,392 B2
(45) Date of Patent: Sep. 21, 2021

(54) INNOVATIVE THERMAL MANAGEMENT APPROACHES OF CONFORMABLE TANKS

(71) Applicant: GM GLOBAL TECHNOLOGY OPERATIONS LLC, Detroit, MI (US)

(72) Inventors: Mahmoud Abd Elhamid, Troy, MI (US); Mei Cai, Bloomfield Hills, MI (US); Anne M. Dailly, West Bloomfield, MI (US); Thomas A. Yersak, Ferndale, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 232 days.

(21) Appl. No.: 16/353,317

(22) Filed: Mar. 14, 2019

(65) Prior Publication Data
US 2019/0211972 A1 Jul. 11, 2019

Related U.S. Application Data (62) Division of application No. 15/267,810, filed on Sep. 16, 2016, now Pat. No. 10,337,671.

(51) Int. Cl.
*F17C 13/00* (2006.01)
*F17C 13/02* (2006.01)
(Continued)

(52) U.S. Cl.
CPC .............. *F17C 13/02* (2013.01); *F17C 1/00* (2013.01); *F17C 5/06* (2013.01); *F17C 11/005* (2013.01); *F17C 11/007* (2013.01); *F17C 2201/0138* (2013.01); *F17C 2205/0352* (2013.01); *F17C 2221/012* (2013.01); *F17C 2221/033* (2013.01); *F17C 2227/0302* (2013.01); *F17C 2227/0337* (2013.01); *F17C 2227/04* (2013.01); *F17C 2250/0439* (2013.01); *F17C 2250/0689* (2013.01); *F17C 2270/0168* (2013.01); *Y02E 60/32* (2013.01)

(58) Field of Classification Search
CPC ........ Y02E 60/32; F17C 11/00; F17C 11/005; F17C 11/007; F17C 5/06; F17C 2250/0439; F17C 2227/0337–0355
See application file for complete search history.

(56) References Cited

U.S. PATENT DOCUMENTS 6,015,041 A * 1/2000 Heung ................. F17C 11/005
206/70
6,444,166 B1 9/2002 Garrett
(Continued)

FOREIGN PATENT DOCUMENTS

CN 2926752 Y 6/2006
CN 202048351 U 12/2010
(Continued)

*Primary Examiner* — Eric S Ruppert
(74) *Attorney, Agent, or Firm* — Lorenz & Kopf LLP (57) ABSTRACT

A storage vessel includes a plurality of storage cells arranged in series. The storage vessel defines a first port that opens into at least one of the storage cells. A fill conduit is connected to the storage vessel at the port. A valve is connected with the fill conduit and is configured to control a supply of fluid through the fill conduit to fill the storage vessel. A heat sink is disposed in the storage vessel and is configured to reduce heat of the fluid during the fill of the storage vessel.

20 Claims, 6 Drawing Sheets

(51) Int. Cl.
  *F17C 1/00* (2006.01)
  *F17C 5/06* (2006.01)
  *F17C 11/00* (2006.01)

(56) References Cited

U.S. PATENT DOCUMENTS

| | | | |
|---|---|---|---|
| 10,054,267 B2 | 8/2018 | Yersak | |
| 2005/0287407 A1* | 12/2005 | Bushko | H01M 8/04208 |
| | | | 141/82 |
| 2008/0026167 A1 | 1/2008 | Endres | |
| 2009/0095016 A1* | 4/2009 | Schmidt-Ihn | H01M 8/04201 |
| | | | 62/601 |
| 2009/0185972 A1* | 7/2009 | Lee | F17C 11/005 |
| | | | 423/658.2 |
| 2011/0111954 A1* | 5/2011 | Li | C01B 3/0036 |
| | | | 502/406 |
| 2014/0020408 A1 | 1/2014 | Berchowitz | |
| 2014/0174152 A1 | 1/2014 | Gil et al. | |
| 2014/0130522 A1 | 5/2014 | Steffen | |
| 2014/0305951 A1* | 10/2014 | Griffith | F17C 1/00 |
| | | | 220/581 |
| 2016/0265478 A1 | 9/2016 | Oversby | |

FOREIGN PATENT DOCUMENTS

| | | | |
|---|---|---|---|
| JP | 61096298 | A | 10/1984 |
| JP | 08159395 | A | 12/1994 |
| JP | 09126394 | A | 10/1995 |
| WO | 02007120782 | A2 | 10/2007 |

* cited by examiner

Fig. 13

INNOVATIVE THERMAL MANAGEMENT APPROACHES OF CONFORMABLE TANKS

CROSS REFERENCE TO RELATED APPLICATIONS

This application is a divisional application of, and claims the benefit of, co-pending U.S. application Ser. No. 15/267,810, filed Sep. 16, 2016.

INTRODUCTION

The field to which the disclosure generally relates may include storage vessels and more specifically, may include thermal management features for improved performance and/or for efficient refueling of storage vessels.

The storage of liquid or gas compositions involves a number of considerations, which are multiplied when the storage vessel is on-board a vehicle. For example, a storage vessel (tank), may be configured for the recurring receipt of fuel, for effective storage, and for the delivery of fuel on demand for use. In such applications, challenges may arise due to the vehicle's mobility, a fluctuating environment, operating pressure ranges, and refueling needs. One such challenge includes meeting requirements without adding excessive weight, which would be counterproductive in achieving the storage needs. Other challenges may exist, such as those related to achieving standards, and those related to efficient packaging of a storage vessel. Within this space, achieving the desired performance and efficient refueling of storage vessels is complex.

SUMMARY

In a number of variations, a product may include a storage vessel that may define a first port opening into the storage vessel, and that may define a second port opening into the storage vessel. A first fill conduit may be connected to the storage vessel at the first port. A second fill conduit may be connected to the storage vessel at the second port. A control mechanism may be connected with the first and second fill conduits. A supply conduit may be connected to the control mechanism. The control mechanism may provide a flow path from the supply conduit to at least one of the first or second fill conduits to fill the storage vessel.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION

The following description of the variations is merely illustrative in nature and is in no way intended to limit the scope of the invention, its application, or uses.

In a number of variations a storage system may be employed to receive, store, and/or deliver a composition or a number of compositions, which may be gas, may be liquid, may be held by—or as—a solid, or may be a combination of any of the foregoing. In a number of variations the composition(s) may be a fuel gas such as methane, propane, hydrogen, acetylene, propylene, or may be another fluid. In some variations, the composition or compositions may include natural gas, that may be transferred in gas and/or liquid form, and that may be stored using a compressed natural gas (CNG) approach, or an adsorbed natural gas (ANG) approach, or any other available approach. In a number of variations a storage system may employ efficient packaging techniques so that pressure vessels may be carried in available space, such as in a vehicle. Storage vessels of this type are said to be "conformable," and can depart from a standard cylindrical shape to conform within the available space. Variations on this type of pressure vessel are described in co-pending U.S. patent application Ser. No. 15/167,625 entitled Pressure Vessel Array, filed May 27, 2016, which is commonly assigned, and which is specifically incorporated herein by reference.

Figure 1:
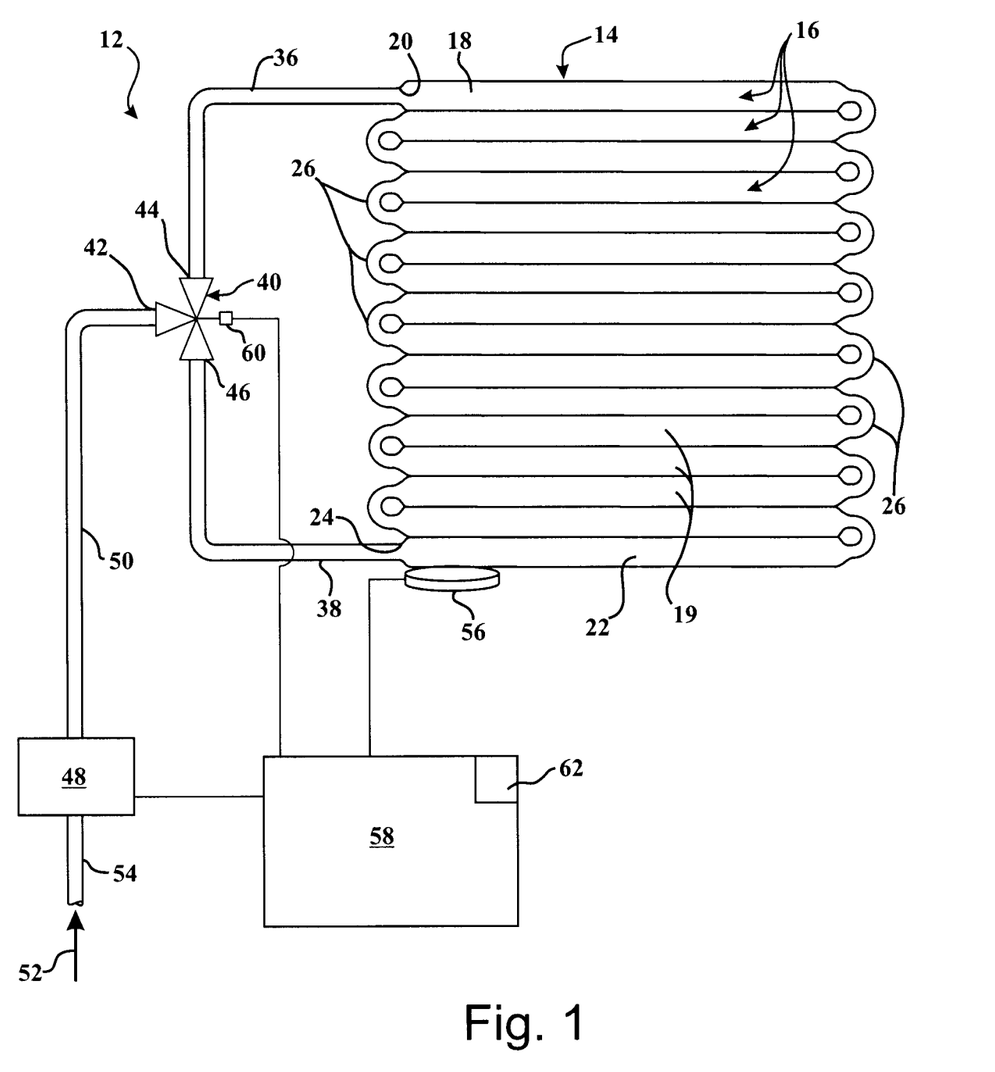
FIG. 1 is a schematic illustration of a storage system according to a number of variations.

With reference to FIG. 1, in a number of variations a system 12 may be provided for filling/refilling of a pressure vessel assembly 14. The pressure vessel assembly 14 may be a segmented type container with a number of interconnected cells 16 that may be connected in series, or may be of another configuration. In a number of variations, one cell 16 may form a segment 18 of the pressure vessel assembly 14, and may include a port 20 that may provide an opening to the pressure vessel assembly 14. Another cell 16 may form another segment 22 of the pressure vessel assembly 14, and may include a port 24 that may provide another opening to the pressure vessel assembly 14. In a number of variations the port 20 and/or the port 24, and/or another port or ports, may be located at other cell(s) 16, instead of at the ends of the pressure vessel assembly 14. For example, one or more ports may be located at any of the intermediate interconnected segments 19. The set of intermediate interconnected segments 19 may include all of the cells 16 between the segment 18 and the segment 22, which in a number of variations may vary in number and configuration. In a number of variations, the cells 16 may be completely open in their interior. The interior of the segment 18 may be connected with the interior of the segment 22 through a number of cells 16, forming the intermediate interconnected segments 19, which may be arranged in series. As a result, in a number of variations a composition entering the port 20 must pass through each and every cell 16 to reach the segment 22. Similarly, a composition entering the port 24 must pass through each and every cell 16 to reach the segment 18. As one skilled in the art will understand, when a particle enters one of the ports 20, 24, it may travel only a part of the distance through the interconnected segments 19 due to the storage mechanism employed. For example, particles may settle in various parts of the storage vessel 14 due to compression, adsorption, etc. Each of the cells 16 may be individual storage vessels connected to the adjacent vessel(s) in the series chain by connecting conduits 26. The cells 16 may each have similar construction, or their constructions may vary. The cells 16 may be physically arranged in a package that may be tailored to fit within the available design space of the application. The pressure vessel assembly 14 may be but one in any number of variations of pressure vessels to be employed in the system 12.

Figure 2:
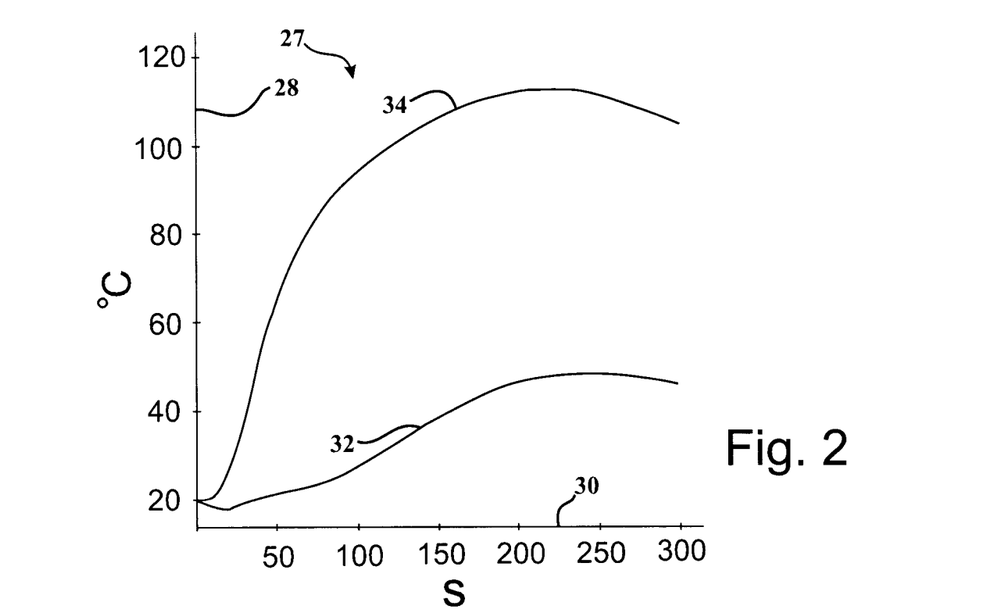
FIG. 2 is a graph of a pair of curves depicting temperature in degrees Celsius on the vertical axis and time in seconds on the horizontal axis.

With reference to FIG. 2, depicted is a graph 27 of temperature in degrees Celsius on the axis 28 and refill time in seconds on the axis 30. The graph 27 represents natural gas filling of the pressure vessel assembly 14 as a type 4 conformable pressure vessel constructed according to International Organization for Standardization (ISO), standards. Curve 32 depicts the average temperature of the entire pressure vessel assembly 14 during an accelerated refill elapsing approximately 300 seconds, and delivered through port 20. Curve 34 depicts the average temperature of the segment 22 as the last cell 16 in the series of sixteen cells of the pressure vessel assembly 14, during the accelerated refill. The graph 27 demonstrates that during fast refueling of a type 4 conformable natural gas tank as the pressure vessel 14, the temperature of natural gas in the tank increases due to pressure work heating. The temperature of the last segment (segment 22) may be multiple times greater than the average temperature of the pressure vessel assembly 14. This may occur, at least in-part, due to minimal mixing of cool inlet gas with heated gas that is already in the pressure vessel assembly 14. The temperature of the segment 22, which in the case of pressure vessel assembly 14 may be the sixteenth segment or cell, may transiently exceed desirable limits. Temperature rise in the cells 16 adjacent the segment 22 may also increase substantially higher than the average temperature of the pressure vessel assembly 14.

Referring again to FIG. 1, the pressure vessel assembly 14 may, according to a number of variations, be configured with a conduit 36 connected at the port 20 and a conduit 38 connected at the port 24. The conduits 36, 38 may each lead to and may be connected with a control mechanism 40. The control mechanism 40 may be configured to control flow from an inlet 42 to a pair of outlets 44, 46. The control mechanism 40 may be a high pressure, high-flow, three-way normally closed valve. In other variations two, two-way valves, or any arrangement where flow is controlled to deliver product from the inlet 42 to one and/or both the outlets 44, 46 may be used. The inlet 42 may be connected with a control unit 48 through a conduit 50. The control unit 48 may include sensors, such as pressure sensors, an automatic shut off valve, other valve(s), a backflow preventer, control devices, and/or other components known in the art for the supply of a compressed fluid. A supply of product for storage in the pressure vessel assembly 14 may be delivered through a conduit 54 to the control unit 48. A quick connect receptacle (not shown), may be included as known in the art for connection with a refueling station. One or more temperature sensors 56 may be provided in, or on, the segment 22, and in other variations may be provided at other locations of the pressure vessel assembly 14. One or more actuators 60 may be provided on the control mechanism 40, and may be in connected communication with a controller 58. The controller 58 may also be in connected communication with the control unit 48 and the temperature sensor 56.

In a number of variations, the controller 58 may include one or more electronic controller components 62. In operation of the electronic controller components 62, methods, algorithms, or parts thereof may be implemented in a computer program(s) product including instructions or calculations carried on a computer readable medium for use by one or more processors to implement one or more of the method steps or instructions. The computer program product may include one or more software programs comprised of program instructions in source code, object code, executable code or other formats; one or more firmware programs; or hardware description language files; and any program related data. The data may include data structures, look-up tables, or data in any other suitable format. The program instructions may include program modules, routines, programs, objects, components, and/or the like. The computer program may be executed on one processor or on multiple processors in communication with one another.

In a number of variations, the program(s) may be embodied on computer readable media, which can include one or more storage devices, articles of manufacture, or the like. The computer readable medium also may include computer to computer connections, for example, when data may be transferred or provided over a network or another communications connection (either wired, wireless, or a combination thereof). It is therefore to be understood that methods described herein may be at least partially performed by any electronic articles and/or devices capable of executing instructions corresponding to one or more steps of the disclosed methods. In a number of variations the electronic controller components 40 may implement programs to continuously, or intermittently, adjust the control mechanism 40 during a refueling operation, which may be done in coordination with the control unit 48 and/or the temperature sensor 56.

Figure 3:
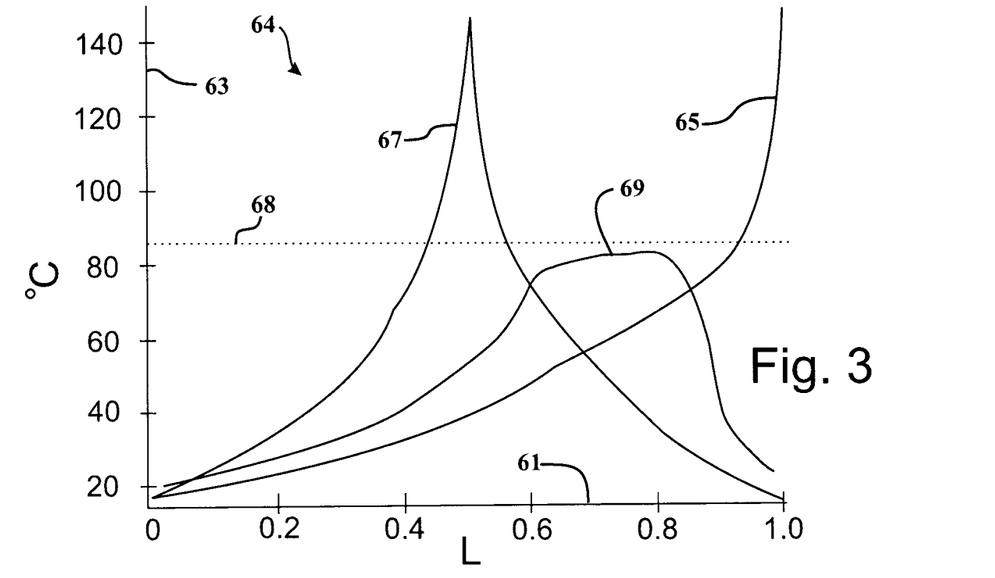
FIG. 3 is a graph of a trio of curves depicting temperature in degrees Celsius on the vertical axis and normalized length from an inlet in fractions of the length of the total storage vessel on the horizontal axis.

With reference to FIG. 3, depicted is a graph 64 showing temperature during refueling in degrees Celsius on the vertical axis 63 and normalized length from an inlet in fractions of the length of the total storage vessel 14 on the horizontal axis 61. In other words, "L" is the length to locations along the pressure vessel assembly 14 with zero being adjacent the port 20 and 1.0 being adjacent the port 24. Curve 65 illustrates that during fast refill delivered through the port 20 only, temperature is at a maximum near the length 1.0, which is adjacent the port 24 in the segment 22. Curve 67 illustrates that during fast refill delivered (continuously), through both port 20 and port 24, temperature is at a maximum near the length 0.5, which is near the mid-point of the length through the in-series cells 16, between the port 20 and the port 24. Accordingly, FIG. 3 illustrates that manifolding (providing multiple delivery points into the pressure vessel assembly 14 for refueling), by itself, simply moves the high temperature point from the end of the n-series chain of cells 16 to the middle. In this case, both curves 65, 67 exceed the preferred maximum temperature 68.

Figure 4:
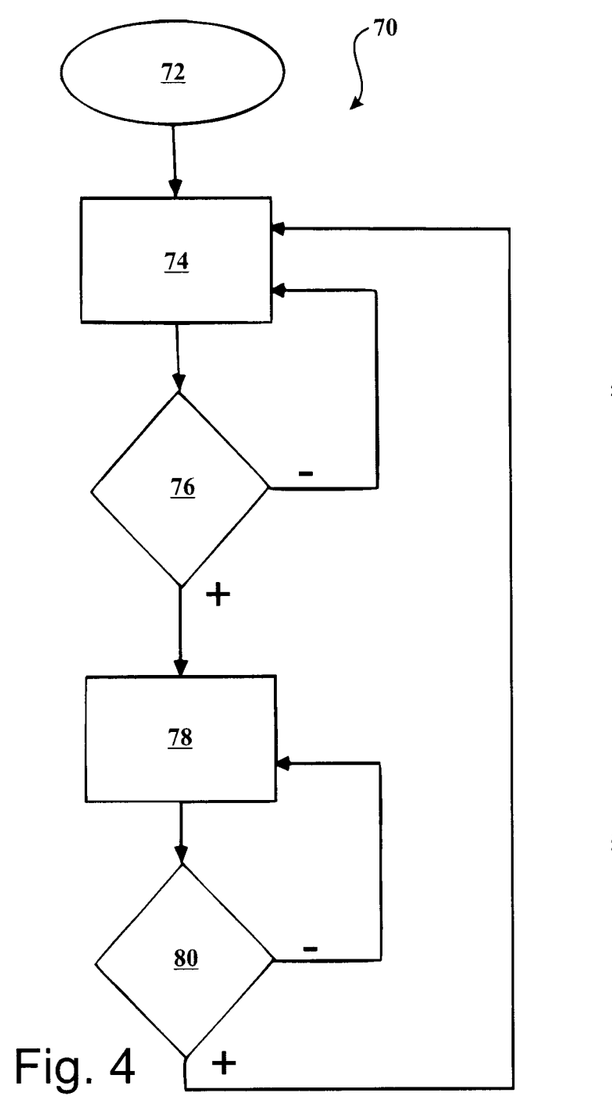
FIG. 4 is a diagram of methods according to a number of variations.
Figure 5:
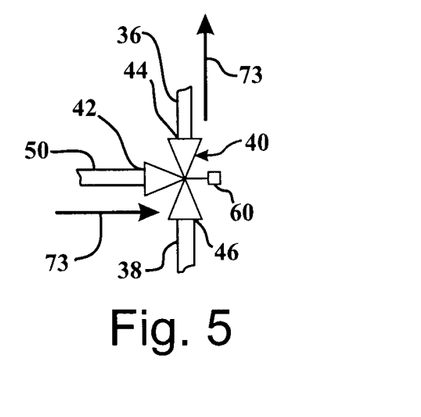
FIG. 5 is a schematic illustration of part of a storage system according to a number of variations.
Figure 6:
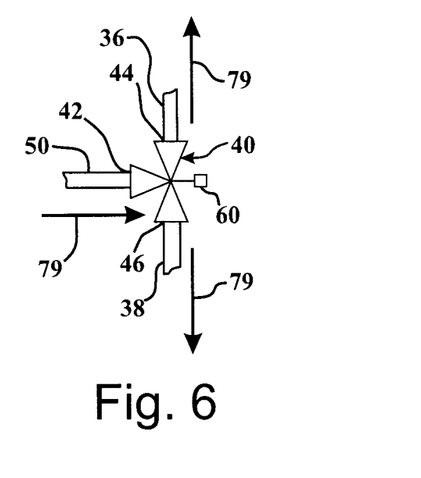
FIG. 6 is a schematic illustration of part of a storage system according to a number of variations.

With reference to FIG. 4, methods 70 according to a number of variations are illustrated. The methods 70 may be initiated at step 72, which may occur when refueling of the system 12 is initiated. This may be determined by the electronic controller components 62, such as through the use of pressure sensors in the control unit 48, a sensor to detect the presence of a refueling system nozzle, or other suitable means. The electronic controller components 62 may continuously monitor the temperature sensor 56, or may be programmed to initiate monitoring when the methods 70 are initiated. From step 72 the methods may proceed to step 74 where the control mechanism 40 may be set to provide an opening between the conduits 50, 36 (Fill 1 state 73 shown in FIG. 5), so that fuel will be supplied to the pressure vessel assembly 14 through the port 20 only. This assumes that the control mechanism is normally closed, meaning that the inlet 42 is normally closed off from the outlets 44, 46. In a number of variations, the control mechanism 40 may default to the Fill 1 state 73, with closure of the system 12 effected through the control unit 48. With the control mechanism 40 set to the Fill 1 state 73, the electronic controller components 62 may permit fueling by opening a path through the control unit 48. With the electronic controller components 62 monitoring the temperature sensor 56, the methods may proceed to step 76 where a determination may be made of whether the sensed temperature is greater than, or equal to, a threshold temperature. The threshold temperature may be selected below the preferred maximum temperature 68 so that operations to reduce the temperature at the segment 22 may be effective without excursions above preferred maximum temperature 68. The threshold temperature may be determined through characteristic testing of the application's system, simulation, or other appropriate means. When the determination at step 76 is negative, the methods 70 may return to step 74 where refueling is continued with the control mechanism in the Fill 1 state 73. The electronic controller components 62 may include a timer function, and the step 76 may be repeated at selected intervals. When the determination at step 76 is positive, meaning that the threshold temperature has been reached or exceeded, the methods 70 may proceed to step 78, where the control mechanism 40 may be set to provide openings from the conduit 50, to both the conduits 36, 38 (Fill 2 state 79 shown in FIG. 6), so that fuel will be supplied to the pressure vessel assembly 14 both through the port 24 and the port 20. With fuel supplied additionally through the port 24, the incoming cool fuel will reduce the temperature in the segment 22 and adjacent areas. In other variations, the opening between the conduits 50, 36 may be closed to more rapidly cool the segment 22, instead of, or before, supplying fuel through both ports 20, 24. The methods 70 may proceed to step 80 where a determination may be made of whether the sensed temperature is less than another threshold temperature. The threshold temperature used at step 80 may be the same threshold temperature used at step 76, or may be selected at a lower temperature to extend cycle time. The threshold temperature used at step 80 may be determined through characteristic testing of the application's system, simulation, or other appropriate means. When the determination at step 80 is negative, the methods 70 may return to step 78 where refueling is continued with the control mechanism in the Fill 2 state 79. The electronic controller components 62 may include a timer function and the step 80 may be repeated at selected intervals. When the determination at step 80 is positive, meaning that the temperature has been reduced below the threshold temperature, the methods 70 may return to step 74, where the control mechanism 40 may be set to provide an opening between the conduits 50, 36 (Fill 1 state 73), so that fuel will be supplied to the pressure vessel assembly 14 through the port 20 only. The methods 70 may provide active cycling of the filling of the pressure vessel assembly 14 between Fill 1 and Fill 2 states 73, 79 (to the extent the threshold temperature is again reached or exceeded), until refueling is complete. In other words, during refueling the system 12 may be modulated between single inlet (port 20), and multiple inlets (ports 20, 24). This intermittent manifolding facilitates mixing of the locally hot fuel with cold incoming fuel. In a number of other variations, cycling between Fill 1 and Fill 2 states 73, 79 may be cycled according to a set frequency that does not depend on the temperature in the tank. Timing of the frequency may be determined through characteristic testing, simulation or other appropriate means during development of the system 12. This passive cycling may enable omission of the temperature sensor 56 and the active cycling control features. When refueling is complete, the methods 70 may be suspended until re-initiated. Referring again to FIG. 3, cycling of the manifolded system 12 according to methods 70 may be depicted by curve 69. Demonstrated is that the methods 70 maintain the temperature of the storage vessel 14 below the preferred maximum temperature 68.

Figure 7:
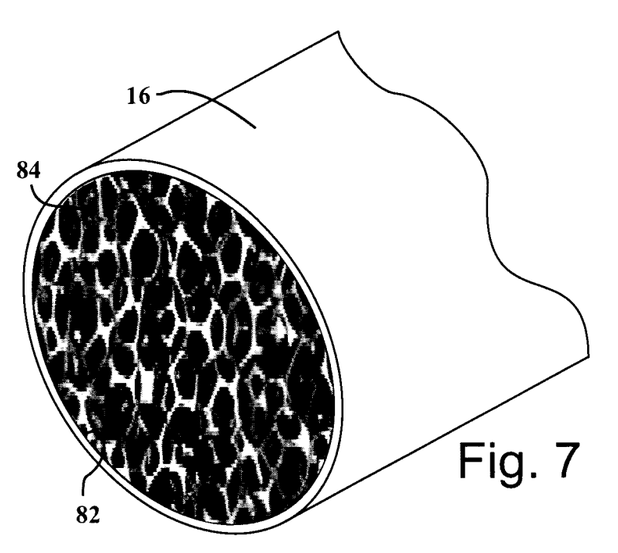
FIG. 7 is a schematic, sectioned view of a part of a storage vessel according to a number of variations.

Referring to FIG. 7, a cross sectional representation of a cell 16 is illustrated according to a number of variations. The cell 16 may be any or all of those included in in the storage vessel 14. In a number of variations the cell 16 according to the variations of FIG. 7 may be the segment 22 and/or may include one or more cells 16 near the segment 22, or may include any of the cells 16. The interior 82 of the cell 16 may contain a heat sink structure 84 that may be comprised of aluminum, stainless steel, or any material with appropriate heat capacity, thermal conductivity and corrosion resistance for the environment containing the application's fuel. The configuration of the heat sink structure 84 may be optimized so that it adequately reduces fuel temperature without hindering flow or compromising storage capacity. Optimization may be accomplished through experimentation or simulation in the selected application. In a number of variations as shown in FIG. 7, the heat sink structure may comprise a micro-truss foam (shown enlarged for visibility), and may be a three-dimensional ordered open-cellular microstructure material. In the case of aluminum, the foam may have a porosity of approximately 87 percent, and approximately 91 percent the case of stainless steel. In a number of variations the heat sink structure may be deformable and/or flexible so that it may be readily deployed in the pressure vessel 14. In a number of variations, the heat sink structure may be inserted into the cell 16 via the narrowed port 24 and may then expand to fill the volume of the cell (segment 22). The heat sink structure 84 may reduce the rise of temperature during refueling by accepting heat. In a number of variations where the volume of the segment 22 is one liter, the heat sink structure 84 deployed in the segment 22 accepts approximately 13 kilojoules of energy via its specific capacity, to reduce the gas temperature to 60° C.

Figure 8:
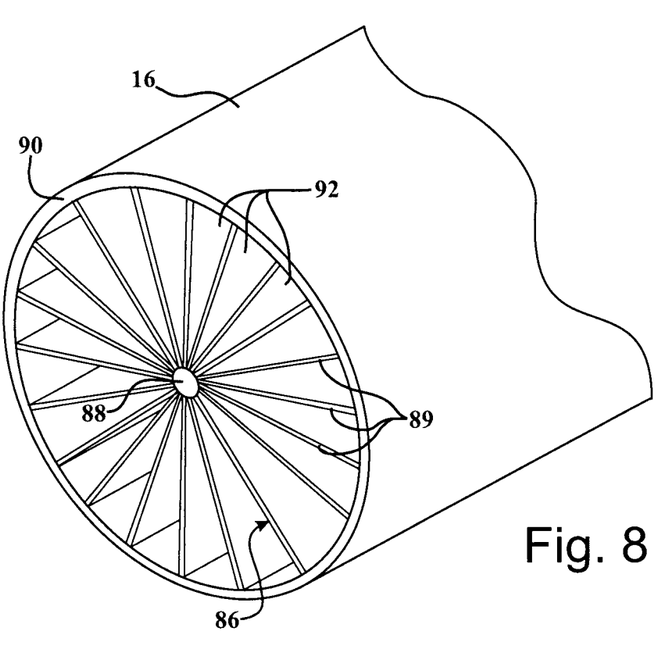
FIG. 8 is a schematic, sectioned view of a part of a storage vessel according to a number of variations.
Figure 9:
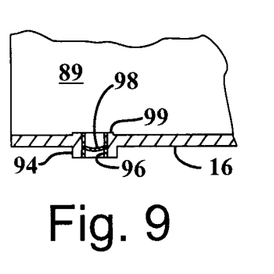
FIG. 9 is a schematic sectioned view of a part of a storage vessel according to a number of variations.

In a number of variations the cell 16 may contain a heat sink structure 86 as shown in FIG. 8. The heat sink structure 86 may have a radial design with a center rod 88 that may extend longitudinally along the center of the inside of the cell 16. A number of radiating plates 89 may extend from the center rod 88 to the wall 90 of the cell 16. A number of voids 92 may exist inside the cell 16 between each pair of adjacent plates 89. In a CNG system, the voids may remain open to receive the stored fluid. In an ANG system, the voids may contain an adsorbent to hold the stored fluid. During refueling, fuel entering the cell 16 may give up heat to the heat sink structure 86 maintaining pressure vessel assembly 14 temperatures below a preferred maximum. In a number of variations the plates 89 may be replaced with mesh, rods or wires extending between the center rod 88 and the wall 90. In a number of variations as illustrated in FIG. 9, the cell 16 may include a boss 94 that may include an opening 96 that may contain a burst disc 98. The boss 94 and burst disc 98 may have significant thermal mass due to their metal construction. Thermal communication between the heat sink structure 86 and the boss 94 and/or the burst disc 98 may be effected, such as by brazing/welding 99, or fastening a portion of the heat sink structure 86 (such as the plate 89), to an exposed section of boss 94 or burst disc 98. Engagement and/or connection of the heat sink structure 86 with the boss 94 and/or burst disc 98 provides additional heat transfer from the stored fluid.

Figure 10:
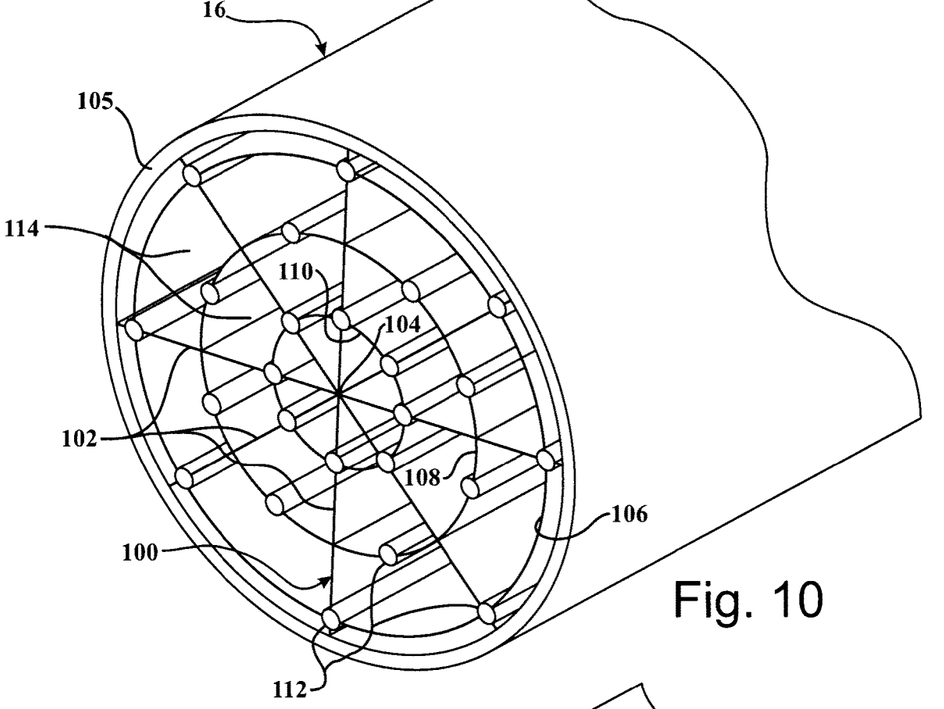
FIG. 10 is a schematic, sectioned view of a part of a storage vessel according to a number of variations.

In a number of variations as illustrated in FIG. 10, a cell 16 may include a heat exchanger 100, which may include coolant micro-channels. The heat exchanger 100 may include a supporting structure with radiating plates 102 that may be connected at their center 104, and each may extend to the wall 105 of the cell 16. Tubes 106, 108, 110 may be concentric and may intersect with, and may be connected with, the radiating plates 102. The tubes 106, 108, 110 may support a number of coolant tubes 112 dispersed around the inside of the cell 16 and extending longitudinally therein. The coolant tubes 112 may be in contact with the supporting structure of the heat exchanger 100. The coolant tubes 112 may contain a coolant fluid that may be static or circulated. In an ANG system the voids 114 may contain an adsorbent. Examples of suitable adsorbents may include carbon (e.g., activated carbons, super-activated carbon, carbon nanotubes, carbon nanofibers, carbon molecular sieves, zeolite templated carbons, etc.), zeolites, metal-organic framework (MOF) materials, porous polymer networks (e.g., PAF-1 or PPN-4), and combinations thereof. Examples of suitable zeolites include zeolite X, zeolite Y, zeolite LSX, MCM-41 zeolites, silicoaluminophosphates (SAPOs), and combinations thereof. Examples of suitable metal-organic frameworks include HKUST-1, MOF-74, ZIF-8, and/or the like, which are constructed by linking structural building units (inorganic clusters) with organic linkers (e.g., carboxylate linkers).

Figure 11:
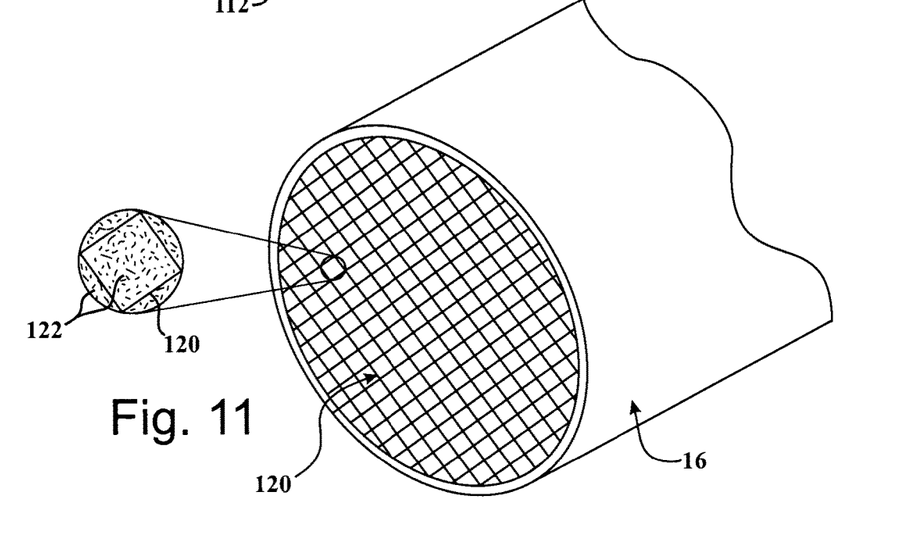
FIG. 11 is a schematic, sectioned view of a part of a storage vessel according to a number of variations.

With reference to FIG. 11, in a number of variations a cell 16 may contain a heat sink structure 120 that may comprise a template of a material with high heat capacity such as aluminum or stainless steel. The heat sink structure 120 may be configured in a matrix structure embedded with a storage media 122 (partially shown enlarged), such as an adsorbent described above. The heat sink structure 120 may draw heat from the fuel/adsorbent for reduced temperature increases during refueling.

Figures 12, 13:
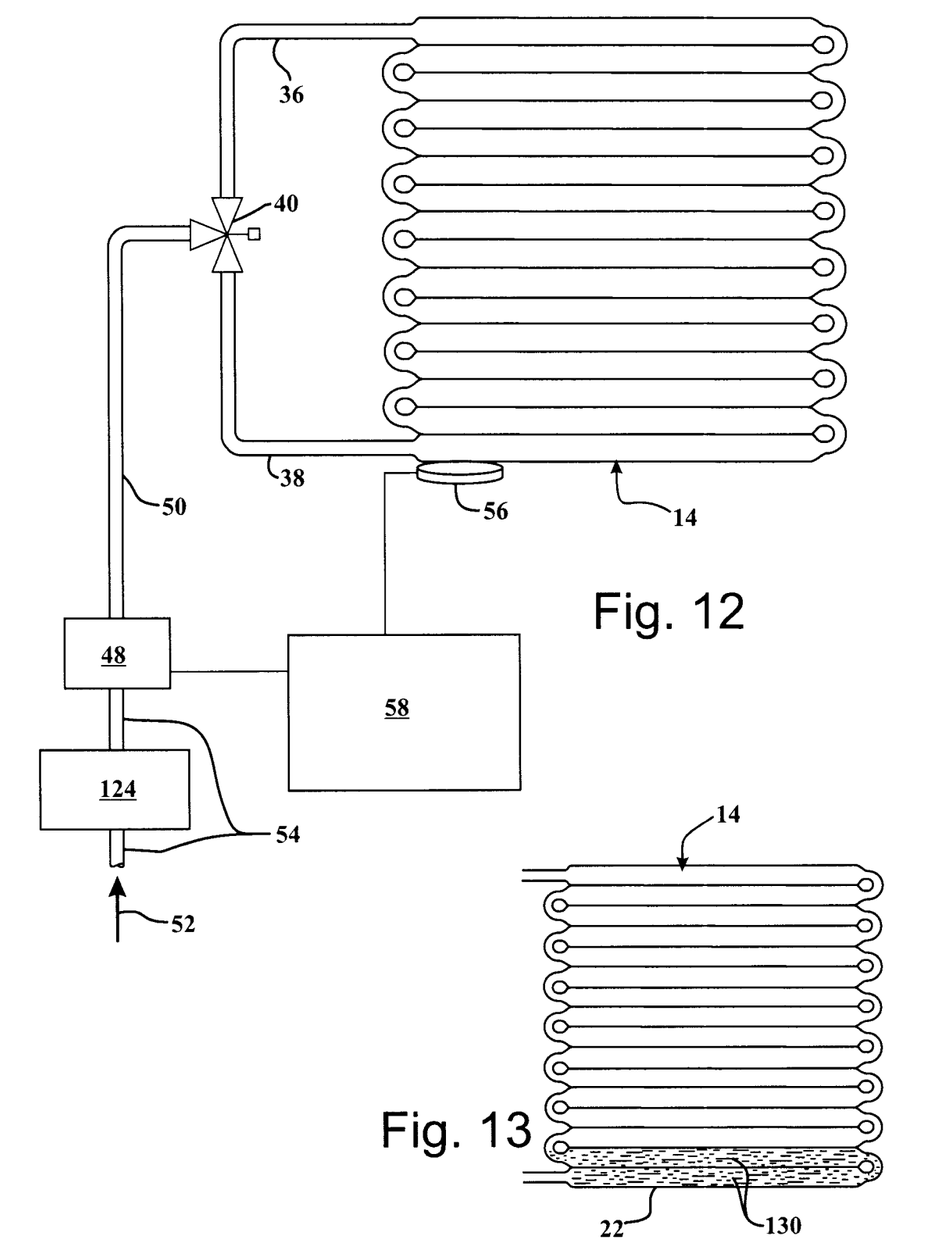
FIG. 12 is a schematic illustration of a storage system according to a number of variations.
FIG. 13 is a schematic illustration of a storage vessel according to a number of variations.

In a number of variations as illustrated in FIG. 12, pre-chilling of the fuel may counteract the rising heat of the adsorbent bed in the pressure vessel assembly 14 due to heat of filling/adsorption. A pre-cooler 124 may be included in the fuel supply system such as in the conduit 54. The pre-cooler 124 may passively cool using a Joule-Thomson expansion or may actively cool using a chiller/heat exchanger.

With additional reference to FIG. 13, in a number of variations the pressure vessel assembly 14 may include thermal management by using the latent heat of phase change materials (PCMs) to reduce the rise of temperature during refueling as a result of natural gas compression, etc. PCM 130 may be included in any of the cells 16. In a number of variations, PCM 130 may be selectively applied to the last tank segment(s), such as segment 22 and its adjacent cell 16 of the pressure vessel assembly 14. The PCM 130 may be incorporated into a conformable tank either as a component of the tank liner or as a component of a heat transfer structure in the volume of the tank. Such structures as described above may include plates, wires, rods, or meshes and may be made of materials such as aluminum or stainless steel. In a number of variations, the PCM 130 may be any material with a melting point temperature less than the desired maximum tank temperature (such as preferred maximum temperature 68). In this example, the temperature may be approximately 60° C. Examples of PCMs include sodium sulfate hydrate, paraffin wax, capric acid, PEG900, lauric-palmitic, P116 wax, E48, and A164. It has been found that in the case of natural gas storage, using paraffin wax as the PCM approximately 5.2 percent of the volume of the segment 22 may be consumed by the PCM 130 using its latent heat when passing through a phase change for desirable temperature management. Following fill of the pressure vessel assembly 14, heat will be gradually released, and the PCM 130 may pass through a reverse phase change such as from liquid to solid.

Through the foregoing variations, temperature increases that arise in pressure vessels due to pressure work heating may be managed to maintain temperatures below a preferred threshold. The variations may be used with a number of stored fluids and in particular may be employed in the storage of natural gas using CNG or ANG technologies. In addition, the variations may be useful in conformable storage vessels.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a product that may include a storage vessel. First and second ports may open into the storage vessel. A first fill conduit may be connected to the storage vessel at the first port. A second fill conduit may be connected to the storage vessel at the second port. A control mechanism may be connected with the first and second fill conduits. A supply conduit may be connected to the control mechanism. The control mechanism may provide a flow path from the supply conduit to at least one of the first or second fill conduits to fill the storage vessel.

Variation 2 may include the product of variation 1, and a sensor may be disposed to monitor heat in the storage vessel. A controller may be in communication with the sensor and the control mechanism. The controller may effect modulation of the control mechanism to direct fill between the first and second fill conduits in response to changes detected by the sensor.

Variation 3 may include the product of variation 2 wherein the controller may modulate the control mechanism between a first state opening the supply conduit to the first fill conduit and a second state opening the supply conduit to both of the first and second fill conduits.

Variation 4 may include the product of variation 1 and may include a heat sink disposed in the storage vessel. The heat sink may be made of a material selected to have a specific heat capacity to receive heat generated during fill of the storage vessel.

Variation 5 may include the product of variation 1 and may include a heat sink disposed in the storage vessel. The heat sink may include a phase change material selected to have a latent heat capacity to receive heat generated during fill of the storage vessel.

Variation 6 may include the product of variation 1 and may include a pre-cooler associated with the supply conduit to effect cooling of a fluid supplied to the storage vessel prior to delivery into the storage vessel to offset heat generated during fill of the storage vessel.

Variation 7 may involve a product that may include a storage vessel. At least one port may open into the storage vessel. A heat sink may be disposed in the storage vessel. The heat sink may include a material selected to have a heat capacity to receive heat generated during fill of the storage vessel.

Variation 8 may include the product of variation 7 wherein the storage vessel may include a number of cells that may be connected in series to extend from a first end to a second end of the storage vessel. The port may be disposed at the first end and the heat sink may be disposed adjacent the second end.

Variation 9 may include the product of variation 7, and a second port may open into the storage vessel. A first fill conduit may be connected to the storage vessel at the port. A second fill conduit may be connected to the storage vessel at the second port. A control mechanism may be connected with the first and second fill conduits. A supply conduit may be connected to the control mechanism. The control mechanism may provide a flow path from the supply conduit to at least one of the first or second fill conduits to fill the storage vessel.

Variation 10 may involve a method of operating the product of claim 9 and may include filling the supply vessel through the control mechanism. The control mechanism may be modulated between a first state where the supply conduit may be open to only the port and a second state where the supply conduit may be open to both the port and the second port.

Variation 11 may include the method of variation 10 and may include modulating control mechanism at a predetermined frequency.

Variation 12 may include the method of variation 10 and may include positioning a sensor to monitor heat in the storage vessel. A threshold temperature may be selected. The control mechanism may be modulated to the first state when the heat is below the threshold temperature, and to the second state when the heat is above the threshold temperature.

Variation 13 may include the product of variation 9 and may include a pre-cooler associated with the supply conduit to effect cooling of a fluid supplied to the storage vessel prior to delivery into the storage vessel to offset heat generated during fill of the storage vessel.

Variation 14 may include the product of variation 7 wherein the heat sink may include a phase change material selected to have a latent heat capacity to receive heat generated during fill of the storage vessel.

Variation 15 may include the product of variation 7 wherein the heat sink may include a structure having a number of tubes. A coolant may be disposed in the tubes.

Variation 16 may include the product of variation 15 wherein the structure may define voids in the storage vessel. An adsorbent may be contained in the voids.

Variation 17 may include the product of variation 7 wherein the heat sink may include a micro-truss foam.

Variation 18 may include the product of variation 7 wherein the storage vessel may have an interior. The heat sink may include a structure with a number of radiating elements, and may extend completely across the interior.

Variation 19 may include the product of variation 7 wherein the heat sink may include a mesh structure. A storage media may be embedded in the mesh structure.

Variation 20 may involve a product that may include a storage vessel. A port may open into the storage vessel. A fill conduit may be connected to the storage vessel at the port. A pre-cooler may be disposed to cool fluid entering the storage vessel through fill conduit.

Variation 21 may include the product of variation 20 and may include an adsorbent disposed in the storage vessel.

Variation 22 may include the product of variation 20 and may include a second port that may open into the storage vessel. A second fill conduit may be connected to the storage vessel at the second port. A control mechanism may be connected with the fill conduit, and may be connected with the second fill conduit. A supply conduit may be connected to the control mechanism. The control mechanism may provide a flow path from the supply conduit to at least one of the fill conduit or the second fill conduit to fill the storage vessel.

The above description of select variations within the scope of the invention is merely illustrative in nature and, thus, variations or variants thereof are not to be regarded as a departure from the spirit and scope of the invention.

What is claimed is:

1. A storage vessel comprising:
    a plurality of storage cells arranged in a series of serpentine interconnected cells, the plurality of storage cells including a fill storage cell at a first end of the series, an end storage cell at a second end of the series, and a plural number of intermediate cells disposed between the fill storage cell and the end storage cell, the storage vessel defining a port that opens into the fill storage cell;
    a fill conduit connected to the fill storage cell of the storage vessel at the port for a filling of the storage vessel;
    a valve connected with the fill conduit and configured to control a supply of fluid through the fill conduit to fill the storage vessel, the storage vessel configured to fill with the fluid entering through the port and proceeding first into the fill storage cell, then through each of the intermediate cells, and last to the end storage cell; and
    a heat sink disposed in the end storage cell of the storage vessel and configured to reduce heat of the fluid during the fill of the storage vessel,
    wherein the fill storage cell is devoid of the heat sink,
    wherein the heat sink is configured to absorb heat rise in the end storage cell during the filling, maintaining the storage vessel below a threshold maximum temperature.

2. The storage vessel of claim 1, wherein each of the plurality of storage cells, other than the end storage cell, are devoid of the heat sink.

3. The storage vessel of claim 1, wherein each of the plurality of storage cells is continuously open to all others of the plurality of storage cells, wherein the storage vessel comprises a structure having the threshold maximum temperature wherein the heat sink comprises a material selected to have a specific heat capacity to receive heat generated during the fill of the storage vessel to maintain the fluid below the threshold maximum temperature.

4. The storage vessel of claim 1, comprising:
a temperature sensor positioned to monitor heat in the end storage cell of the storage vessel,
wherein the valve is configured to modulate filling the storage vessel through the port when the heat is above a threshold temperature,
wherein the threshold temperature is lower than the threshold maximum temperature.

5. The storage vessel of claim 1, wherein the heat sink comprises a material selected to have a specific heat capacity adequate to receive heat generated during fill of the storage vessel to maintain the fluid below sixty-degrees Celsius.

6. The storage vessel of claim 1, wherein the heat sink comprises a phase change material selected to have a latent heat capacity to receive heat generated during fill of the storage vessel to maintain the fluid below a maximum temperature.

7. The storage vessel of claim 1, wherein the plurality of storage cells are connected in series to extend from the fill storage cell to the end storage cell in a segmented arrangement and comprising:
connecting conduits interconnecting adjacent of the plurality of storage cells,
wherein the plurality of storage cells are configured so that a fuel introduced into the storage vessel through the port must travel through every one of the plurality of storage cells to reach the heat sink.

8. The storage vessel of claim 1, wherein the heat sink comprises a structure that extends completely across at least one of the plurality of storage cells.

9. The storage vessel of claim 8, wherein the structure includes cooling tubes configured to contain a coolant.

10. The storage vessel of claim 1, comprising an adsorbent disposed within voids defined by the heat sink.

11. A storage vessel comprising:
a plurality of storage cells arranged as a series of serpentine interconnected cells, the plurality of storage cells including a fill storage cell at a first end of the series, an end storage cell at a second end of the series, and a plural number of intermediate cells disposed between the fill storage cell and the end storage cell, the fill storage cell defining a port that opens into the storage vessel;
a fill conduit connected with the port;
a supply conduit configured to fill the storage vessel through the port and first into the fill storage cell, then successively through each of the intermediate cells, and last into the end storage cell;
a control valve connected with the fill conduit and with the supply conduit and configured to control the fill of the storage vessel with a fluid; and
a heat sink disposed in the storage vessel at the end storage cell, the heat sink comprising a material selected to have a heat capacity to receive heat generated during fill of the storage vessel to maintain the fluid below a maximum temperature,
wherein the fill storage cell is devoid of the heat sink,
wherein the heat sink is configured to absorb heat rise in the end storage cell during the filling, maintaining the storage vessel below a threshold maximum temperature.

12. The storage vessel of claim 11, comprising:
a temperature sensor positioned to monitor heat in the storage vessel,
wherein the control valve is configured to modulate filling the storage vessel through the port when the heat is above a threshold temperature,
wherein the threshold temperature is lower than the maximum temperature.

13. The storage vessel of claim 11, wherein the heat sink comprises a phase change material selected to have a latent heat capacity to receive heat generated during fill of the storage vessel to maintain the fluid below a maximum temperature.

14. The storage vessel of claim 11, comprising:
connecting conduits interconnecting adjacent of the plurality of storage cells;
wherein the plurality of storage cells are configured so that a fuel introduced into the storage vessel through the port must travel through every one of the storage cells before reaching the heat sink in the end storage cell.

15. The storage vessel of claim 11, wherein the heat sink comprises a structure that extends completely across at least one of the plurality of storage cells.

16. The storage vessel of claim 15, wherein the structure includes cooling tubes configured to contain a coolant.

17. The storage vessel of claim 15, comprising an adsorbent disposed within voids defined by the structure.

18. The storage vessel of claim 15, wherein the structure comprises a micro-truss foam.

19. The storage vessel of claim 11 comprising:
a pre-cooler disposed in the supply conduit and configured to effect cooling of the fluid supplied to the storage vessel prior to delivery into the storage vessel to offset heat generated during fill of the storage vessel; and
a shut off valve disposed in the supply conduit between the pre-cooler and the control valve, the shut off valve configured to close the supply conduit.

20. A storage vessel comprising:
a plurality of storage cells arranged in a series of serpentine interconnected cells, the plurality of storage cells including a fill storage cell at a first end of the series, an end storage cell at a second end of the series, and a plural number of intermediate cells disposed between the fill storage cell and the end storage cell, the fill storage cell defining a port that opens into the storage vessel;
a fill conduit connected with the port for a fill of the storage vessel;
a supply conduit configured to fill the storage vessel through the port;
a pre-cooler disposed in the supply conduit to cool fluid entering the storage vessel through the supply conduit;
a control valve disposed in the supply conduit between the pre-cooler and the storage vessel and configured to control flow of a fluid to the port;
a shut off valve disposed in the supply conduit between the pre-cooler and the control valve and configured to close the supply conduit; and
a heat sink disposed in the storage vessel at the end storage cell only, the heat sink configured to absorb heat in the end storage cell during the fill to maintain the storage vessel, in entirety, below a maximum temperature, the heat sink comprising a material selected to have a heat capacity to receive heat generated during the fill of the storage vessel to maintain the the storage vessel below the maximum temperature, without inclusion of the heat sink in any of the plurality of storage cells other than the end storage cell.

* * * * *